(12) United States Patent
Swensen

(10) Patent No.: US 6,530,730 B2
(45) Date of Patent: Mar. 11, 2003

(54) ARTICLE-ANCHORING DEVICE FOR VEHICLE AND METHOD OF PRODUCING

(76) Inventor: Frederick B. Swensen, 6824 Peters Pike, Dayton, OH (US) 45414

( * ) Notice: Subject to any disclaimer, the term of this patent is extended or adjusted under 35 U.S.C. 154(b) by 0 days.

(21) Appl. No.: 09/756,607

(22) Filed: Jan. 8, 2001

(65) Prior Publication Data

US 2001/0031185 A1 Oct. 18, 2001

Related U.S. Application Data

(60) Provisional application No. 60/196,126, filed on Apr. 11, 2000.

(51) Int. Cl.[7] .................................................. B60P 7/08
(52) U.S. Cl. ...................... 410/106; 410/108; 410/115; 410/116; 296/39.2
(58) Field of Search ................................. 410/106, 108, 410/110, 115, 116, 94; 296/39.2

(56) References Cited

U.S. PATENT DOCUMENTS

| | | | | | |
|---|---|---|---|---|---|
| 4,850,769 A | * | 7/1989 | Matthews | .................... | 410/105 |
| 5,076,745 A | * | 12/1991 | Klein | ........................... | 410/94 |
| 5,533,848 A | * | 7/1996 | Davis | ......................... | 410/105 |
| 5,549,428 A | * | 8/1996 | Yeatts | .......................... | 410/94 |
| 5,738,471 A | * | 4/1998 | Zentner et al. | ............. | 410/110 |
| 5,827,023 A | * | 10/1998 | Stull | ........................... | 410/110 |
| 6,012,885 A | * | 1/2000 | Taylor et al. | .................. | 410/94 |
| 6,065,916 A | * | 5/2000 | Swensen | ....................... | 410/97 |
| 6,176,657 B1 | * | 1/2001 | Romph | ......................... | 410/94 |

* cited by examiner

Primary Examiner—Stephen T. Gordon
(74) Attorney, Agent, or Firm—William Weigl

(57) ABSTRACT

A tie system for the bed of a pick-up truck or an article-receiving tray has elongated coplanar corrugated ribs, with selected ribs or portions of ribs having spaced holes or openings extending horizontally therethrough for enabling hook-ended elastic tie downs to anchor objects that are being transported. Provision is made to avoid communication through the holes from one side of the system or tray to the other, thus rendering it leak-proof. The strength, minimal friction during loading, cleanability and water impermeability characteristics of the liner are retained, while adding the desirable feature of being able to selectively anchor objects of any shape and size in any location on the bed.

12 Claims, 4 Drawing Sheets

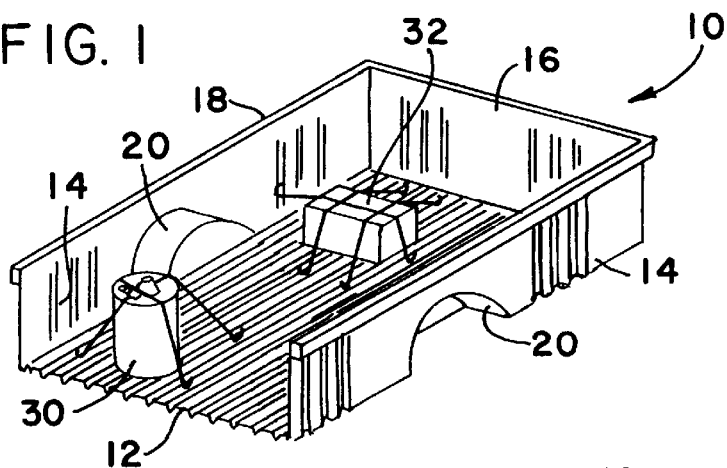
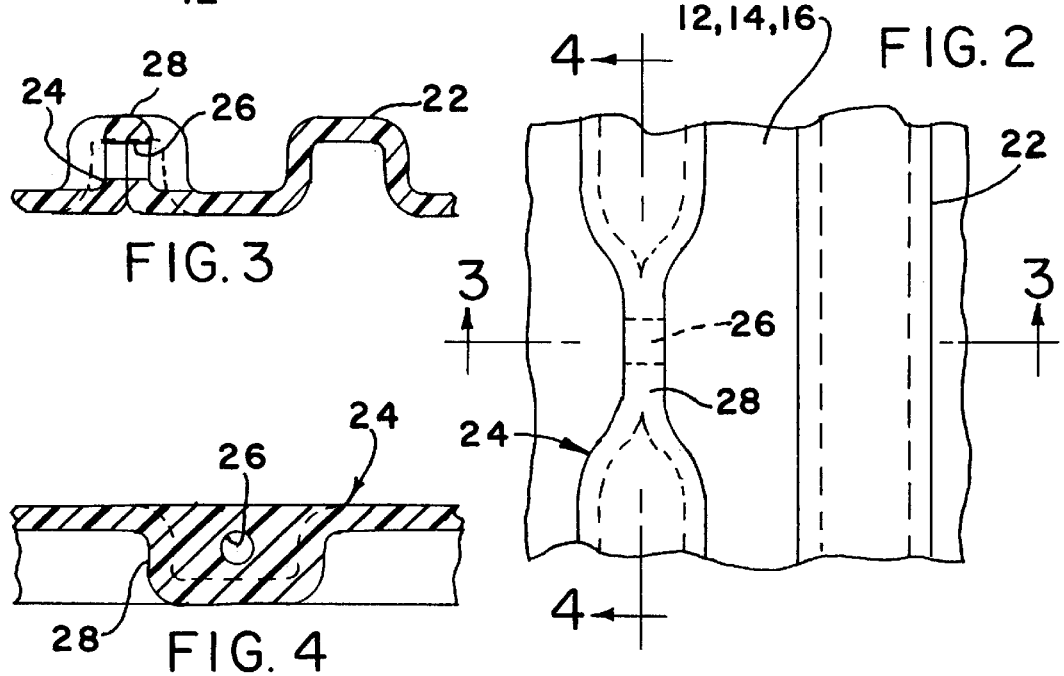
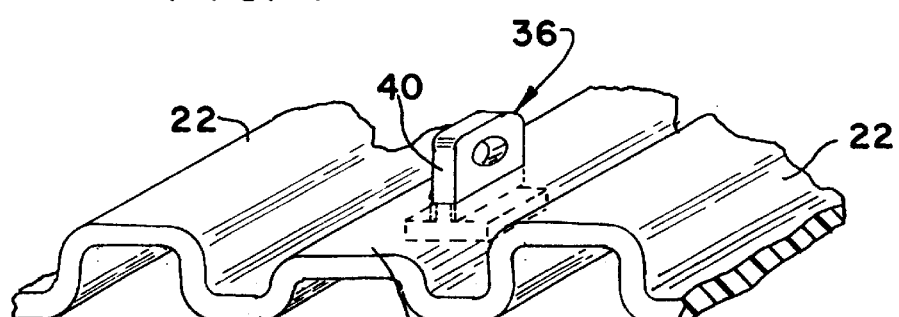
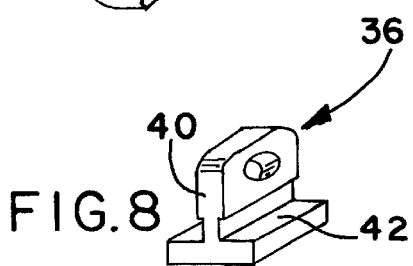

ARTICLE-ANCHORING DEVICE FOR VEHICLE AND METHOD OF PRODUCING

This application is based on my U.S. Provisional Patent Application Ser. No. 60/196126 filed Apr. 11, 2000.

This invention relates to an anchoring device adapted to enable securing and transporting of articles on a vehicle surface such as the bed of a pick-up truck, by means of tie downs with hooks at their ends. It further relates to a method of producing such devices.

BACKGROUND OF THE INVENTION

Well before the introduction of the very popular small pick-up truck in the United States, owners and truck manufacturers alike recognized the need to protect the truck bed from scratching and dents caused by bouncing and sliding of loads which could abrade the bed surfaces and sides. This damaged not only the truck bed, but also the objects being transported. Paint scratches would render the bed surface susceptible to corrosion and rusting, particularly if the truck was left out in wet weather. This disadvantage was successfully combated with the mass introduction of the plastic bed liner, a vacuum-molded unibody construction that effectively covered the truck bed and the vertical walls surrounding the bed. The hinged tail gate was covered by a flat panel of the same material, making the two separate pieces fully enclose all but the top of the vehicle load-carrying area.

Although the liners were flexible and somewhat yielding when unsupported, they were required to have sufficient strength and rigidity when in place on the truck bed. This was easily accomplished by making at least the floor or bottom wall of corrugated ribs of approximately one-half inch in width and height, usually extending lengthwise of the bed. The ribs could readily withstand the weight of a cargo load and also that of a few men standing in the truck. The ribs were spaced parallel to one another on about one-and-one quarter inch centers across the width and for most of the length of the liner. Generally, they were longitudinal relative to the truck, but some rib designs are diagonal. To prevent sand, dirt and water from passing through the liner floor or walls to the bed of the truck, there were no openings through the liner, the floor being essentially liquid impervious. Sand and dirt were of concern because of their abrasiveness, since sand risked wearing the bed paint if sand grains would be pressed against the paint whenever a person stood or walked on the corrugated floor during loading and unloading. While many popular trucks have liners made to specifically and relatively tightly fit their bed shapes, some are still prone to rain leakage around the edges whether or not they have overhanging edges intended to protect against that risk. Obviously, if the walls or floor bottom of a liner permitted passage of dirt and liquid through the liner, the protection sought in purchasing the liner in the first instance is nullified.

Particularly to enable ease of sliding heavy objects around on the floor of the liner, the top edges or peaks of the ribs were coplanar. The common plastic material used was one that inherently had reduced friction characteristics, ideal for sliding large sheets of plywood, wallboard, etc. around. For this purpose, the rib tops of the liner had to provide an essentially flat surface, i.e., there were to be no projections above the rib tops. Projections or protrusions would inhibit article sliding when needed during loading and unloading. They would tend also to damage things such as wallboard and were a potential tripping point for a person working in the truck bed. They also made use of a flat shovel difficult when unloading sand, dirt or gravel.

While the reduced friction is advantageous for loading and unloading, it is disadvantageous for those times when reduced friction is anathema to the objective sought, such, for example, as avoiding shifting, sliding and rolling of an unstable article while the vehicle is moving. There is a need for a truck bed liner that retains the reduced friction capability for those times when it is needed, but prevents sliding of objects or loads resting on the bottom wall of the liner whenever the intention is to hold them against shifting. Load shifting can be dangerous to truck occupants as well as to others on the road. It risks causing of an accident, as well as causing damage to the vehicle. If something like a toolbox or length of pipe is merely laid freely on an existing standard liner floor, a sharp turn or swerve of the vehicle can cause the box to slide or the pipe to roll across the liner. A resultant noise can distract the driver, causing him or her to look over the shoulder through the rear view window, just long enough to risk having an accident.

Numerous attempts have been made in the prior art to solve the problem of load shifting by securing the load, but all have been somewhat complex, resulting in a liner floor which is difficult if not impossible to clean or sacrifices desirable attributes of existing liners. One patent, U.S. Pat. No. 5,253,918 issued Oct. 19, 1993 to Stephen R. Wood et al, shows a variety of ways for tying down articles to a bed liner. One embodiment incorporates the provision of holes in protrusions rising above the ribs of a bed liner. The protrusions effectively prevent the tops of the ribs from being used as a flat surface on which articles can be slid during loading and unloading of cargo. Those same protrusions make walking on the liner difficult without the potential for tripping. The protrusions also span three ribs crosswise, making water drainage and cleanability an additional problem due to the damming effect across the valleys between the ribs. The manner in which the protrusions are made also requires a special top surface for the vacuum form and necessitates placement of a number of vertically-standing washers on the form for each liner produced. These washers become integral parts of the liner when removed from the form. It is uncertain whether the above '918 patent teaching is capable of providing a leak proof liner surface.

There also exists the need to stabilize certain types of articles during vehicular transportation in a car trunk or on the bed of a station wagon, van or sports utility vehicle (SUV). One solution to this problem is illustrated in my U.S. Pat. No. 6,065,916 issued May 23, 2000 and entitled Portable Base for Anchoring and Transporting Unstable Articles. While quite suitable for handling dry or clean articles, the base of my '916 patent is not leak-proof and is therefore incapable of preventing liquid, dirt or sand particles from wetting or dirtying the underlying carpet or floor.

In recent years, an alternative to truck bed liners has been introduced, namely, a spray-on protective coating that permanently adheres to the inside surfaces of the bed. To date, there appears to be no known solution to preventing sliding, rolling or other shifting of cargo in such coated beds. It further appears that coated beds do not have the same reduced friction surfaces as do plastic molded bed liners, making loading and unloading of heavy or large objects a bit more difficult.

SUMMARY OF THE INVENTION

The bed liner of a pick-up truck has elongated corrugated ribs with selected ribs or portions of ribs having holes or openings extending horizontally therethrough for enabling elastic tie downs to anchor objects that are being transported, the anchoring being done in any location on the truck bed. The design is such that the holes do not pass through the liner, i.e., the inner (upper) surface of the liner does not communicate with the outer (lower) surface thereof. The strength, minimal friction, cleanability and water impermeability characteristics of the liner are retained, while adding the desirable feature of being able to selectively anchor objects of any shape and size in any location on the bed. The liner preferably may have the holes produced in the liner at the time of manufacture, or the holes may be made by the purchaser in selected locations before or after installation in the truck. The holes may, in some designs, be located in separate elements that are installed on the liner. The liner may be separate from or integral with the body structure of a truck bed. The invention is also applicable to a panel used on the floor of a car trunk or van to carry wet or dirty items such as boots, etc., adding the anchoring feature to its usefulness.

A principal object of the invention is to provide a truck bed liner which retains the desirable characteristics of a reduced-friction flat top surface and impermeability to sand, dirt and water, while adding the further features of enabling variably positioning and secure anchoring of objects to be transported.

Another object is to provide for anchoring holes to be provided in the bed liner either at the time of manufacture or afterward, integral with or separate from the liner.

Still another object of the invention is the provision of anchoring holes below the top surface of a liner, i.e., avoiding the protrusion of anchoring means extending above the top surface.

Yet another object is to provide a leak-proof truck bed article-anchoring device that may be separate from or integral with the body structure of the truck.

A further object is to provide a liner or other panel which has the characteristics of liquid impermeability, cleanability and strength, but which can have anchoring holes or openings added thereto at any time while retaining those characteristics.

Another object is to avoid having anchoring holes above a top surface of coplanar ribs and to further avoid damming of liquid or dirt from draining or being removed from between the ribs.

Still another object is to provide a novel method of producing solid material portions in a vacuum-formed corrugated panel for enabling creation of holes through the solid portions.

Other objects and advantages will become apparent from the following description, in which reference is made to the accompanying drawings.

BRIEF DESCRIPTION OF THE DRAWINGS

FIG. 1 is a simplified isometric view of a bed liner illustrating two different objects secured to the floor or bottom wall of the liner, as the liner would rest on the bed of a truck.

FIG. 2 is an enlarged plan view portion of the floor and/or walls of the liner of FIG. 1, illustrating a preferred form of my invention.

FIG. 3 is a cross-sectional view taken substantially along lines 3—3 of FIG. 2.

FIG. 4 is a cross-sectional view taken substantially along lines 4—4 of FIG. 2.

FIG. 7 illustrates still another variation in which the anchoring holes are provided in parts that are separable from and secured to the liner main body.

FIG. 8 is an enlarged view of one of the separable parts of FIG. 7, showing how the part is secured to the liner body

DESCRIPTION OF THE PREFERRED EMBODIMENTS

Figures 5, 6:
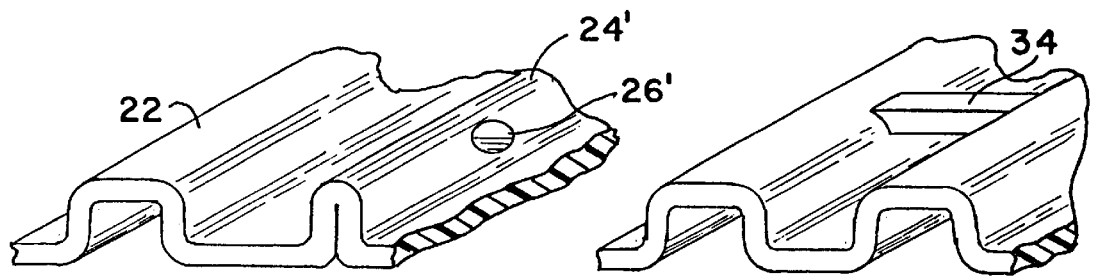
FIG. 5 is an isometric view of a variation of the rib construction in which selected ribs may be made of solid material for their full lengths.
FIG. 6 illustrates in isometric form still yet another variation of a molded liner with anchoring openings provided by a bridge spanning a pair of adjacent ribs.

FIG. 1 is a simplified pictorial view of one form of a separate bed liner 10 embodying my invention. The liner includes a floor or bottom wall 12, a pair of opposed side walls 14 and a front wall 16. A separate tail gate panel (not shown) would normally cover the open left end of the liner 10, and would be mounted on the typical hinged tail gate. Many liner designs are provided with a rail guard or ledge 18 extending around the liner 10 for a short distance outwardly of the side and front walls to protect the upper edges of the side and front walls of the truck bed body structure and also inhibit dirt and liquids from getting between the walls of the liner and the bed. Indentations 20 are molded into the liner to cover the typical inset wheel wells of the truck.

Corrugations or ribs 22 shown in greater detail in FIG. 2 are provided on the floor 12, and are preferably also on the side and front walls 14 and 16. As used herein, the term corrugation is intended to include any configuration in which an air space is provided between adjacent ribs or points, etc., on opposite sides of a panel. These corrugations provide stiffening of the walls of the liner and retention of its shape. The ribs 22 provide a firm supporting surface for both individuals and cargo loads. Additionally, the ribs on the outer side outer side of the bottom wall provide an air space between the liner and the truck bed for enabling drying and drainage of moisture. A plurality of anchoring ribs 24 are interspersed between every few ribs 22, these anchoring ribs 24 having holes 26 formed in solid material necked-down portions 28 so as not to communicate with the lower surface of the liner 10. Obviously, if the holes 26 were made directly through the hollow ribs 22, sand, dirt, water, mulch and various other particulate materials carried by the truck could pass through the holes, ultimately causing damage to the truck bed, particularly when moisture is also present. To avoid this possibility, and to provide a narrow opening for receipt, for example, of the hook of the typical tie down such as an elastic bungee cord, the portion 28 is preferably formed in the molded liner 10 approximately one quarter of an inch in width, and about one half inch in length and height. For use with ropes, cords or other non-elastic tie downs, the openings and the solid portions may be made larger than shown to accommodate whatever kind of tie down is used.

In the event a conventional process is employed in producing the liner, an anchoring rib 24 may be initially shaped identically to a rib 22. After removal from the mold, a section of the rib can be heated and squeezed inwardly from its sides to form the necked-down portion 28. A preferred method of forming the solid portion 28 is discussed in connection with FIGS. 10–12.

FIG. 1 illustrates in very simple fashion the tying down of a gas can 30 and a tool box 32 with a series of bungee cords in widely spaced sections of the liner. The gas can 30 is often full or at least partially full if being carried to a location where a gasoline driven item such as a lawn mower or chain saw is to be used. The mower or saw is also capable of being tied down separately alongside or near the gas can 30 adjacent the truck tail gate. I prefer to have about every third rib an anchoring rib 24. If the ribs 22 are normally around 1¼ to 1½ inches center to center, the anchoring ribs 24 will be spaced between 3¾ to 4½ inches apart across the liner 10. I also prefer that solid portions 28 and their holes 26 of anchoring ribs 24 be spaced about six inches apart along the lengths of the several anchoring ribs 24. This, in essence, gives me an entire liner floor surface over which to locate and tie down objects of various sizes, shapes and weights. The invention is not to be limited by the amount of tie down holes used or their particular dimensions or spacing about the bottom wall or side walls of the liner 10. If I also provide solid portions 28 and their respective holes 26 on the side and front walls 14 and 16, I obtain still greater flexibility in how things are tied down.

The spacing of the holes 26 along an anchoring rib 24 can be modified for special circumstances. If an anchoring rib 24'(FIG. 5) is made solid for its full length, any spacing of holes is feasible. It is contemplated that holes 26' can be drilled or punched anywhere along the rib 24' by the end purchaser of the liner, according to his own needs. For example, if he always ties down objects only in one section of the liner, he needs holes 26' only in that general location. Whether the liner is of the type in FIGS. 2–4, 5 or other variations yet to be described, it should be understood that the upper edges of all ribs are coplanar in order to avoid obstruction or article damage when an article is slid on those upper edges during loading and unloading, and to maintain an even, flat surface for someone who may need to stand or walk on the ribs 22 and 24.

FIG. 6 shows an embodiment in which an anchoring bridge 34 spans adjacent ribs to form the anchoring medium. By leaving space below the bridge 34, hosing or blowing out the liner for clearing the bed is feasible for most loads, without residue of transported material remaining dammed up between ribs on the floor 12. This variation of my invention is not easily vacuum-formed because of the opening below the bridge 34.

FIGS. 7 and 8 illustrate yet another variation of the invention in which separable parts 36 are captured in recesses on the inside of low ribs 38. The ribs 38 are provided with slots through which an upright, slightly tapered portion 40 of the part 36 closely fits. Obviously, since slot creation is not possible when vacuum-forming, they must be made in a separate stage of manufacture, or the liner should be injection molded. As can be best seen in FIG. 8, the upright portion 40 is preferably notched a minute amount on opposite sides where it joins a base 42 so as to snap and be held in place in the liner once inserted there. Alternatively, the elements 36 can be heat or cement-sealed in place. If desired, instead of slots being formed in the liner to receive the upright portions 40, removable knock-outs can be molded in the liner. The purchaser can then select where he wants his anchoring to be located and place the separable parts 36 in sections of the floor and/or side and front walls to suit his particular needs. The knock-outs would remain in place for unselected sections, retaining the impermeability of the liner. One advantage of this form of the invention is the capability of achieving the end anchoring feature at any time during the life of the liner. A disadvantage, however, is that if additional parts 36 are to be installed after the liner has already been in use in a truck, it would have to be removed to install more such parts.

Figure 9:
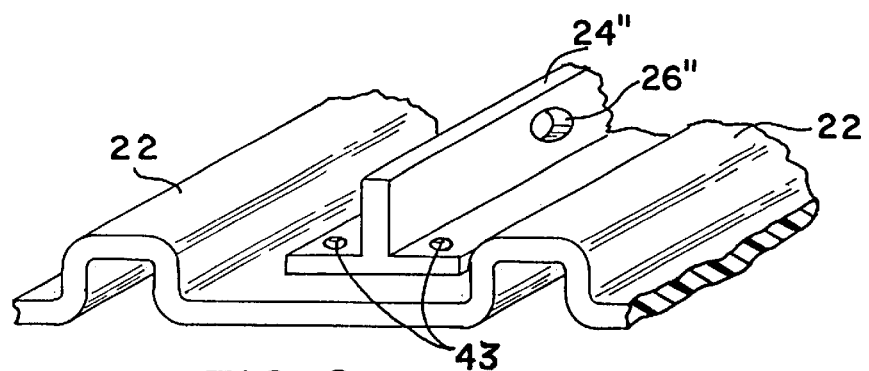
FIG. 9 illustrates still another variation of rib which may be separable from the main body of the liner and attached thereto after molding.

FIG. 9 shows an alternative form of the invention similar in many respects to that of FIG. 5. Here the anchoring ribs 24" with holes 26" are added after extrusion molding by applying rivets 43 or other fastening means. To accomplish this, selected laterally-spaced ribs 22 are left out of the liner at the time of molding, and the ribs 24" are applied by the liner manufacturer or the purchaser afterward.

Figures 10, 11, 12:
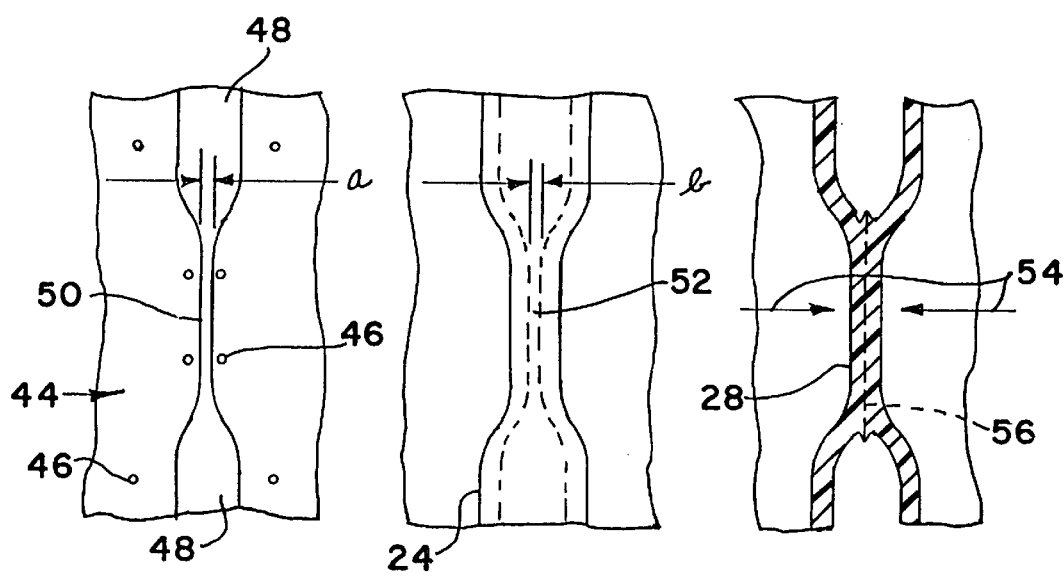
FIGS. 10–12 illustrate a preferred process of producing solid material portions in a rib of a panel produced by vacuum forming.

FIGS. 10–12 illustrate a preferred method of producing a solid material necked-down portion 28 when the liner 10 is vacuum formed. All figures are plan views for making one such portion. FIG. 10 shows a section of a vacuum form or mold 44, FIG. 11 shows the top surface of a liner which has been formed on the mold 44 of FIG. 10, and FIG. 12 shows a half-depth cross-sectional view of the liner of FIG. 11 after laterally-directed heat and pressure have been applied thereto to produce the solid portions 28.

The mold 44 of FIG. 10 has properly-spaced pin holes 46 through which vacuum is conventionally applied to pull down a pliable heated sheet of thermoplastic material against the top surface 48 and surrounding surfaces to create the anchoring rib 24 of FIG. 11. As is understood in the vacuum forming art, the outer edges of a vacuum form and the sheet to be formed are sealed relative to one another to enclose the area of vacuum. The necking down occurs by spanning a thin bridging edge 50 between the two aligned top surfaces 48. When the liner is removed from the mold, an air gap 52 spaces the opposed walls of the necked-down portion apart by a distance appearing as dimension "a" in FIG. 10 and dimension "b" in FIG. 11. Since the necked-down portion 28 is where a hole 26 is to be drilled or punched therethrough, I solidify this area to a sealed condition as shown in FIG. 12. This is done by applying appropriate amounts of heat and pressure in the direction of arrows 54. The opposing walls seal as shown at the dotted line 56. The holes 26 can be punched at the time of sealing, or can be punched or drilled later, either by the manufacturer or the end user.

Figure 13:
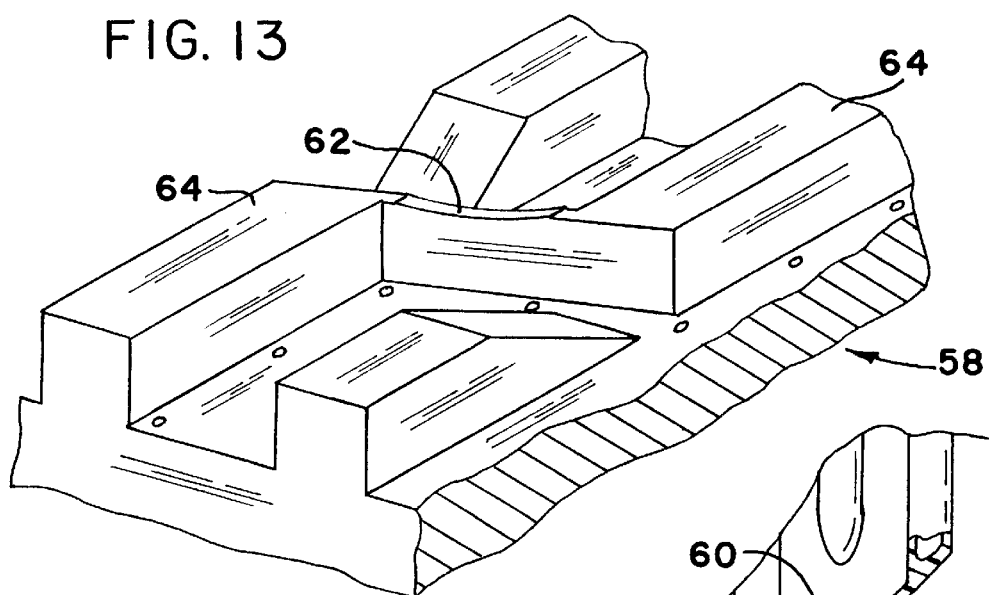
FIG. 13 is an isometric view incorporating a portion of a vacuum form for producing a bed liner that has the good drainability and cleanability characteristics found in FIG. 14.
Figure 14:
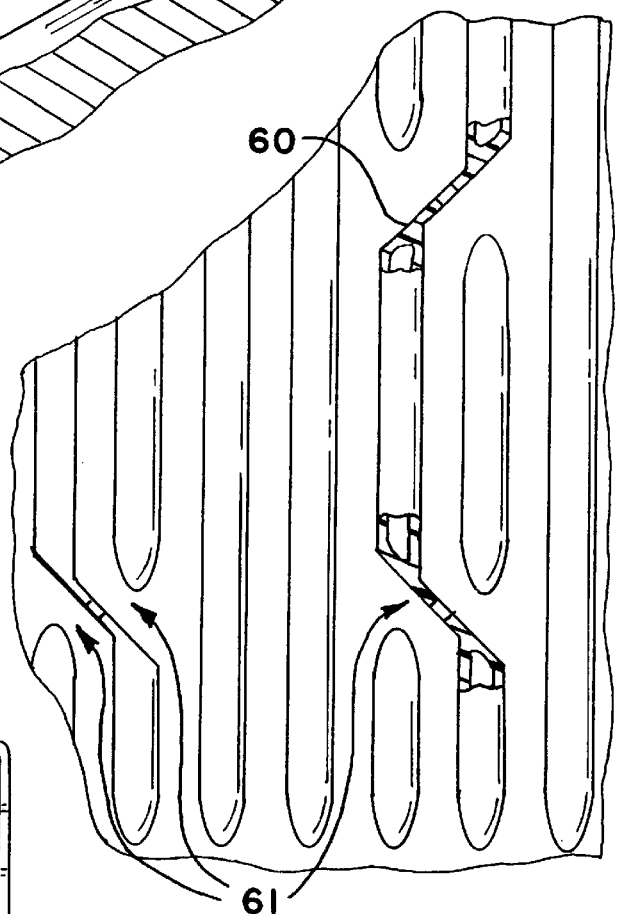
FIG. 14 is a plan view of a portion of a bed liner floor produced on the vacuum form of FIG. 13.

FIGS. 13 and 14 respectively show a vacuum mold segment 58 and a section of a liner floor used to produce diagonal necked-down portions 60 across adjacent ribs of a liner. The advantage of the diagonal portions 60 is to enable ease of drilling the holes by obtaining a better angle and space for a power drill. FIG. 13 shows a narrow bridging edge 62 of the vacuum mold, with a slight downward dip between top surfaces 64. The dip allows an appropriate upward flow of plastic material when the necked-down portion 60 is squeezed together under pressure according to the process described in FIGS. 10–12. A heating tool can be designed to limit the amount of upward flow until the heated plastic aligns itself with the top edges of the ribs of FIG. 14. In this manner, the entire top surface of the ribs of FIG. 14 can kept coplanar as a flat surface, without concern of the adverse effects of bumps or protrusions. It should be noted that the diagonal relation of the portions 60 and the valley gaps 61 of the figure allows for complete water drainage and flushing or blowing dirt along the valleys between the ribs toward the tailgate. This eliminates the possibility of standing water and dirt between the ribs.

Figure 15:
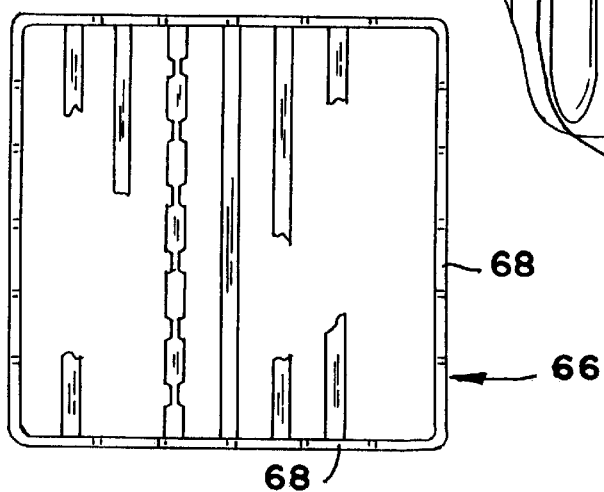
FIG. 15 is a simplified plan view of a panel used in car trunks and on floors of station wagons and the like for protecting carpeting from dirt and water carried on boots, shoes, etc., the panel further incorporating the anchoring feature of my invention so as to make it a multifunction article.

FIG. 15 shows a typical tray 66 with an upturned lip 68 that may be either a corrugation or a solid edge. Such a tray is commonly made of thin-walled plastic for containing wet and dirty objects such as boots and hiking shoes. It protects the carpeting of other floor surface of a trunk or floor of a passenger vehicle. By thickening the sheet material of the tray to about one-eight on an inch to rigidity the tray, it can also be used as an anchoring base similarly to what has been described in connection with the liner 10. The entire lip 68 can be provided with holes at a level high enough to enable the tray to still catch and retain water dripping from whatever the tray is made to contain. Ribs corresponding to ribs 24 can be interspersed centrally with additional anchoring holes. Such ribs can be parallel, radiate outwardly from the center or selectively shaped and spaced to provide a variety of patterns. If desired, depressions can be made with surrounding lips to have standard blow-molded plastic milk cartons stabilized. The objective is to add the anchoring and leak-proof features of my invention to an already-existing product. If desired, parallel ribs exactly matching those of a truck bed liner can extend downwardly below the lip 68 and be made to interdigitate with the bed liner ribs. In essence, the tray 66 can be used to have its downwardly-depending ribs frictionally wedge into the topside ribs of a liner, maximizing surface contact and tending to stabilize the tray to the liner. With tie downs holding an article or articles in place on the tray, and with the further stability of the tray with a liner, the effect is a non-sliding tray on a liner. A tray of the type shown can be any shape and size, and be capable of portability from one vehicle to another, provided it has a large enough underside surface to avoid tipping when carrying a top-heavy article.

Additionally, tray 66 may be a permanent element on the upright back portion of the back seat of a vehicle such as an SUV, where the upright portion can be folded down horizontally with the tray 66 facing upwardly. Obviously, the article-anchoring function should be capable of being performed without liquid or debris passing through the tray.

Figure 16:
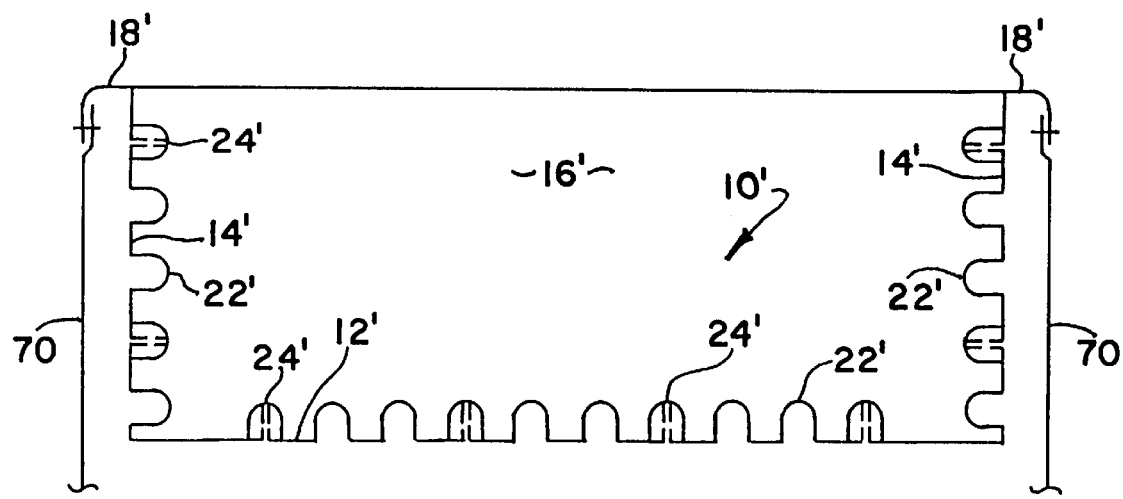
FIG. 16 is a simplified cross-sectional view of another embodiment of a truck bed liner which is manufactured as a permanent integral part of the vehicle bed and has anchoring means on both the bottom and side walls of the bed.

FIG. 16 illustrates in very simple cross-sectional fashion how the liner 10' can be incorporated directly into a truck bed at the time of truck manufacture, as an integral, permanent part of the truck. Vertical walls 70 may be the outside metal walls of the body structure of the vehicle, with the liner 10' having a bottom wall 12', side walls 14' front wall 16' and ledges 18'. The side walls 14' have ribs 22' and 24' extending longitudinally of the truck, but they may be vertical as in the FIG. 1 embodiment. The ribs correspond to similarly-numbered ribs of the other embodiments. Although not shown, structural components would typically support the bottom wall 12' to provide it with sufficient rigidity for supporting loads and individuals standing or walking on the bottom wall 12'.

Figure 17:
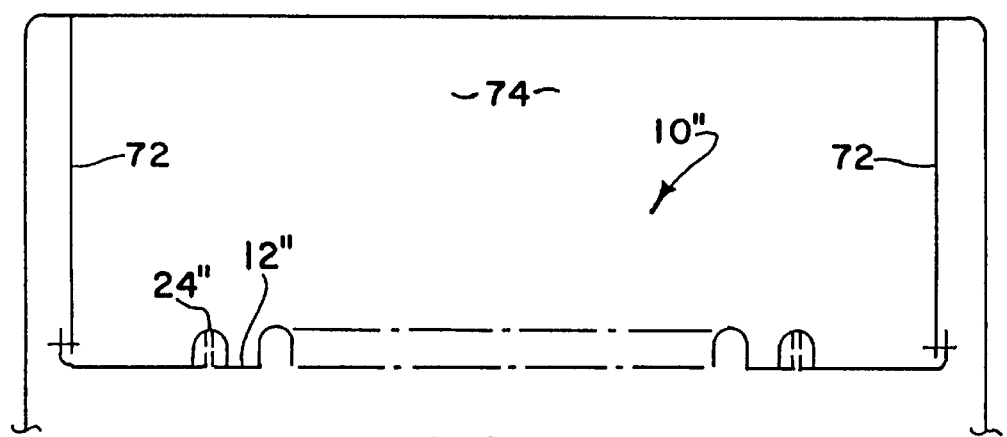
FIG. 17 is a modified version of the FIG. 16 embodiment, having only a bottom wall serving essentially as a tray that is an integral part of the vehicle.

FIG. 17 illustrates an integral liner 10" which consists of a bottom wall 12" attached to bottom edges of inner side walls 72 and front wall 74 of the truck bed. The wall 12" is preferably formed with upturned edges so as to effectively become a shallow tray about all but the tail gate edge of the unit. If desired, various type of protruding anchoring means may be provided on the side walls for use in conjunction with the ribs 24". Alternative anchoring means is feasible on the side walls because they would not obstruct loading or walking on the bottom wall. At the areas of interconnection of the liner edges with the body structure of the vehicle in both this and the FIG. 16 embodiment, appropriate fastening and sealing means are employed. Also, as in the FIG. 16 embodiment, structural components (not shown) will be provided for strengthening the liner 10".

The term "liner" has been used herein in a generic sense, since it most typically involves an article-anchoring device that overlies or "lines" a horizontal surface, either as a truck bed liner or as a tray such as depicted in FIG. 15. It should be understood, however, that the same term is also intended to include any surface which is integral with a vehicle and which is horizontal when performing its anchoring function, such as the anchoring surfaces of FIGS. 16 and 17, or the liner on an upright surface of a vehicle seat that is moved to a horizontal position when serving its primary function.

Various other changes may be made without departing from the spirit and scope of my invention.

Having described my invention, I claim:

1. A truck bed device having a bottom wall, opposed side walls and a front wall adapted to closely fit a truck bed and its side and front walls, said device defining an outer surface generally in contact with the bed of said truck and an inner surface facing inwardly toward material being transported by said truck, said bottom wall having a plurality of spaced, parallel elongated ribs with coplanar top edges and having at least one pair of said ribs having solid material portions of a width between one-eight and three-eighths of an inch in thickness, whereby holes formed in said solid portions will pass essentially horizontally therethrough without communicating with said outer surface of said device.

2. A truck bed device according to claim 1 wherein said device is vacuum-formed from heated thermoplastic sheet material and wherein said solid material portions comprise removable elements that are affixed to said device after it has been vacuum formed.

3. A truck bed article-anchoring device having a bottom wall and opposed upwardly-projecting side walls and a front wall, said walls having inner surfaces facing toward material being transported by said truck, and at least said bottom wall having a plurality of spaced, parallel elongated ribs with coplanar top edges, at least one pair of said ribs having solid material portions including holes formed in said solid material portions which pass essentially horizontally therethrough without communicating with the side of said liner opposite said bottom wall inner surface.

4. A truck bed device according to claim 3 wherein said device is integral with body structure of said truck.

5. A truck bed device according to claim 3 wherein said device comprises a liner that is separate from and is supported by permanent structure of said truck.

6. A truck bed device according to claim 3 wherein at least one of said side and front walls includes ribs and holes corresponding to the ribs and holes in said bottom wall.

7. A truck bed device according to claim 3 wherein all of said walls are an integral single element vacuum-formed from plastic sheet material.

8. A truck bed device according to claim 3 wherein at least said bottom wall is formed as a single sheet of plastic material.

9. A tuck bed device according to claim 5 wherein said truck includes a bed, opposed vertical side walls, a vertical front wall connecting the bed side walls adjacent a cab of the truck and a tail gate, wherein said liner comprises a relatively rigid plastic bed liner closely fitting internally of said truck bed and its side and front walls, said liner bottom wall inner surface comprising a floor portion and a side opposite said bottom wall inner surface comprising a lower surface facing and in contact with said truck bed, the ribs providing reduced-surface contact between articles to be carried by said truck whenever sliding such articles along said liner during loading and unloading said truck, said holes being adapted to receive hooks at opposite ends of elastic tie-down straps for securing articles to said floor portion, and plastic liner material surrounding the holes below the upper surfaces of said ribs so as not to interfere with sliding movement of articles or persons standing on said upper surfaces, and said holes being formed in said plastic material below the upper surfaces of said ribs without communicating with the lower surface of the bed liner.

10. A truck bed device according to claim 9 wherein said hook-receiving holes extend laterally through said solid material portions.

11. A truck bed device according to claim 10 wherein selected ones of said ribs comprise an elongated thin-walled inverted U-section, and wherein an air space encompassed by each said U-second communicates with the lower surface of said liner.

12. A truck bed device according to claim 11 wherein said U-section air space is interrupted longitudinally by a plurality of reduced-width portions formed intermittently along an associated one of said ribs to constitute the solid material portions through which said hook-receiving holes are formed.

* * * * *